United States Patent
Ponamgi

(10) Patent No.: US 9,372,626 B2
(45) Date of Patent: Jun. 21, 2016

(54) PARALLEL STORAGE SYSTEM TESTING WHEREIN I/O TEST PATTERN IDENTIFIES ONE OR MORE SET OF JOBS TO BE EXECUTED CONCURRENTLY

(71) Applicant: Lenovo Enterprise Solutions (Singapore) PTE. LTD, Singapore (SG)

(72) Inventor: Madhav Ponamgi, Furlong, PA (US)

(73) Assignee: LENOVO ENTERPRISE SOLUTIONS (SINGAPORE) PTE. LTG., Serangoon Garden (SG)

( * ) Notice: Subject to any disclaimer, the term of this patent is extended or adjusted under 35 U.S.C. 154(b) by 67 days.

(21) Appl. No.: 14/302,705

(22) Filed: Jun. 12, 2014

(65) Prior Publication Data
US 2015/0363115 A1   Dec. 17, 2015

(51) Int. Cl.
G06F 3/00   (2006.01)
G06F 3/06   (2006.01)

(52) U.S. Cl.
CPC ............ *G06F 3/0611* (2013.01); *G06F 3/0659* (2013.01); *G06F 3/0683* (2013.01)

(58) Field of Classification Search
CPC .............................. G06F 3/0611; G06F 3/0659
USPC .......................................... 718/1; 710/21–24
See application file for complete search history.

(56) References Cited

U.S. PATENT DOCUMENTS

| | | | |
|---|---|---|---|
| 6,430,720 B1* | 8/2002 | Frey ............... | G01R 31/318536 714/700 |
| 2002/0073374 A1* | 6/2002 | Danialy ........... | G01R 31/31724 714/738 |
| 2009/0300605 A1* | 12/2009 | Edwards ............... | G06F 9/5077 718/1 |
| 2013/0091094 A1 | 4/2013 | Nelke et al. | |
| 2013/0290795 A1* | 10/2013 | Rajski ............ | G01R 31/318335 714/712 |
| 2013/0290957 A1 | 10/2013 | Li et al. | |

OTHER PUBLICATIONS

IBM et al., "Advanced I/O Structure in a Hierarchical Multiprocessor System", An IP.com Prior Art Database Technical Disclosure, Original Publication Date: Aug. 1, 1993, Original Disclosure Information: TDB v36 n8 08-93 p. 415-418, IP.com No. IPCOM000105588D, IP.com Electronic Publication: Mar. 20, 2005, IBM Technical Disclosure Bulletin, vol. 36 No. 08 Aug. 1993, Copyright IBM Corp. 1993.
IBM et al., "Input/Output Exerciser Test Package for Personal Systems", An IP.com Prior Art Database Technical Disclosure, Original Publication Date: Sep. 1, 1988, Original Disclosure Information: TBD 09-88 p. 473-475, IP.com No. IPCOM000058287D, IP.com Electronic Publication: Feb. 15, 2005.

* cited by examiner

*Primary Examiner* — Tammara Peyton
(74) *Attorney, Agent, or Firm* — Olive Law Group, PLLC

(57) ABSTRACT

Parallel storage system testing is provided. An input/output (I/O) pattern is received. One or more sets of jobs are determined, based, at least in part, on the I/O pattern. Each of the one or more sets of jobs identifies one or more jobs. Each job identifies one or more I/O operations. Each set of jobs of the one or more sets of jobs is assigned to a processing node of one or more processing nodes. The one or more sets of jobs are executed concurrently.

20 Claims, 6 Drawing Sheets

PARALLEL STORAGE SYSTEM TESTING WHEREIN I/O TEST PATTERN IDENTIFIES ONE OR MORE SET OF JOBS TO BE EXECUTED CONCURRENTLY

BACKGROUND OF THE INVENTION

The present invention relates generally to the field of performance testing and storage performance verification, and more particularly to parallel testing and verification of storage systems.

The Big Data era is increasingly creating file systems and storage in the multi-petabyte range. Storage system testing is a type of performance analysis used to measure, evaluate, and verify various performance characteristics of a storage system or device. Such performance characteristics include measures of access times and data transfer rates. For example, testing of a hard disk drive measures and evaluates seek time and throughput of various read and write operations.

Various conditions affect storage system performance. Variables in storage system speed can include, for example, both the implementation of the file system and the capabilities and specifications of the hardware. Different types of storage media tend to have different capabilities and specifications. For example, a hard disk drive tends to have different performance characteristics than a solid state drive due, in part, to variations in the capabilities and specifications of the two types of storage media. Further, the speed and cache size of the storage media can also affect the performance of the storage system.

SUMMARY

According to one embodiment of the present disclosure, a method for parallel storage system testing is provided. The method includes receiving, by one or more processors, an input/output (I/O) pattern; determining, by one or more processors, one or more sets of jobs based, at least in part, on the I/O pattern, wherein each of the one or more sets of jobs identifies one or more jobs, and wherein each job identifies one or more I/O operations; assigning, by one or more processors, each set of jobs of the one or more sets of jobs to a processing node of one or more processing nodes; and executing, by one or more processors, the one or more sets of jobs concurrently.

According to another embodiment of the present disclosure, a computer program product for parallel storage system testing is provided. The computer program product comprises a computer readable storage medium and program instructions stored on the computer readable storage medium. The program instructions include program instructions to program instructions to receive an input/output (I/O) pattern; program instructions to determine one or more sets of jobs based, at least in part, on the I/O pattern, wherein each of the one or more sets of jobs identifies one or more jobs, and wherein each job identifies one or more I/O operations; program instructions to assign each set of jobs of the one or more sets of jobs to a processing node of one or more processing nodes; and program instructions to execute the one or more sets of jobs concurrently.

According to another embodiment of the present disclosure, a computer system for parallel storage system testing is provided. The computer system includes one or more computer processors, one or more computer readable storage media, and program instructions stored on the computer readable storage media for execution by at least one of the one or more processors. The program instructions include program instructions to program instructions to receive an input/output (I/O) pattern; program instructions to determine one or more sets of jobs based, at least in part, on the I/O pattern, wherein each of the one or more sets of jobs identifies one or more jobs, and wherein each job identifies one or more I/O operations; program instructions to assign each set of jobs of the one or more sets of jobs to a processing node of one or more processing nodes; and program instructions to execute the one or more sets of jobs concurrently.

Another embodiment of the present disclosure provides verification of data as written to a storage system or device. For example, the verification can be performed concurrently with one or more parallel storage system testing.

DETAILED DESCRIPTION

Embodiments of the present invention provide for performance and accuracy testing of file systems and storage media including flash technology using complex parallel I/O profiles. Such testing is not limited to simple transactions and I/O behavior, but instead enable complex asymmetric parallel I/O profiles to model a rich set of file system features that includes tests for metadata, bandwidth, IOPs, byte range locking, etc., as discussed further below. Further provided is the ability to verify storage accuracy (e.g., during performance testing).

Embodiments of the present invention recognize that modern storage solutions are increasingly creating file systems and storage requirements in the multi-petabyte range. Embodiments of the present invention aid storage system designers in creating, testing performance of, and verifying scalable storage architectures that fulfill client application I/O requirements while maintaining storage verification integrity. Embodiments of the present disclosure further provide for benchmarking file systems and many types of storage media to measure whether the storage sub-system has sufficient performance capability in addition to raw capacity. These tools can be embedded within storage devices to profile performance and automatically detect and report system anomalies to prevent catastrophic data loss.

Figure 1:
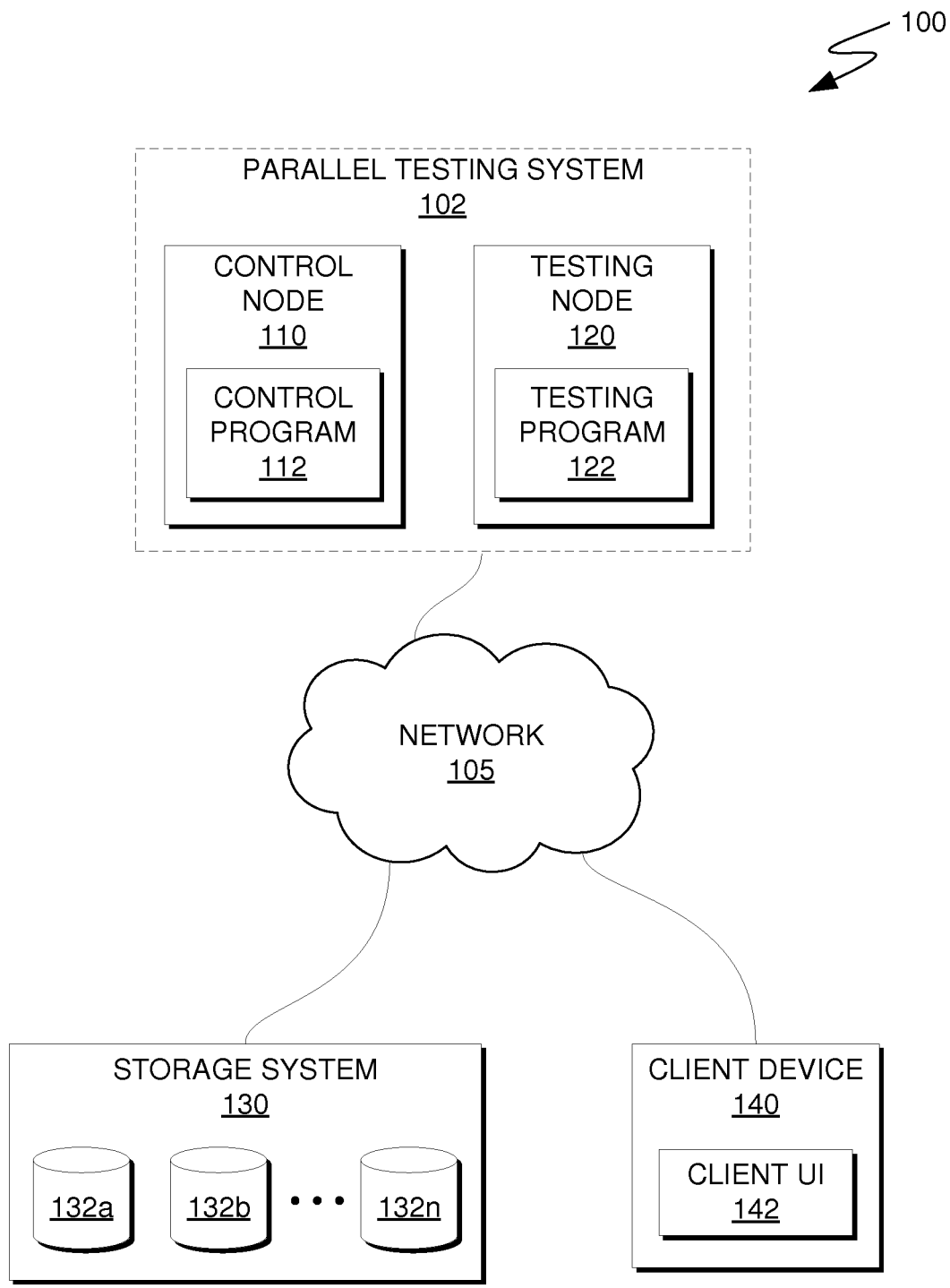
FIG. 1 is a functional block diagram illustrating a computing environment, in accordance with an embodiment of the present disclosure.

The present disclosure will now be described in detail with reference to the Figures. FIG. 1 is a functional block diagram illustrating a testing environment, generally designated 100, in accordance with one embodiment of the present disclosure. Testing environment 100 includes parallel testing system 102, storage system 130, and client device 140, all interconnected over network 105. Parallel testing system 102 includes one or more processing nodes, including control node 110 and testing node 120. Storage system 130 includes storage media 132a-132n (collectively referred to as storage media 132). Client device 140 includes client user interface (UI) 142.

Control node 110 includes control program 112. Testing node 120 includes testing program 122. In some embodiments, each of control node 110 and testing node 120 include one or both of control program 112 and testing program 122. In one embodiment, testing node 120 represents a set of processing nodes capable of operating in parallel, in which case each testing node 120 includes an instance of testing program 122. Each processing node (e.g., testing node 120) executes one or more test operations utilizing one or more threads of execution. In one embodiment, testing node 120 concurrently executes a plurality of threads, each of which performs a test operation. Thus, test operations may be performed by parallel nodes, concurrent threads, or a combination thereof in order to simulate an environment corresponding to a particular I/O pattern. In one embodiment, control node 110 and testing node 120 are capable of communicating with one another (e.g., via network 105).

In some embodiments, control program 112, of one or more processing nodes, receives a set of instructions in the form of a histogram. The instructions indicate what tests to perform, including, for example, what types of tests to perform, how many of each type of test to perform, what patterns to use with each test, and other test details. Control program 112 assigns the tests to various processing nodes, which conduct the tests. Control program 112 gathers the results of the tests and displays them as a histogram of output behaviors, thereby pointing out anomalous system behavior. In various embodiments, the bins performed by a processing node may be the same as, or different than, the bins performed by another processing node. For example, multiple processing nodes perform the same bins, as represented by the same histogram. Further, the parameters of each bin of the multiple processing nodes performing the same bins are, in various examples, the same as one another or different than one another. Alternatively, different processing nodes perform different bins, as represented by different histograms. In various embodiments, each processing node may perform tests concurrently, partially concurrently, or sequentially, relative to other processing nodes. Thus, the histograms (and the I/O operations represented thereby) can be the same or different from one node to another.

In various embodiments of the present invention, each of control node 110 and testing node 120, respectively, can be a standalone device, a server, a laptop computer, a tablet computer, a netbook computer, a personal computer (PC), or a desktop computer. In another embodiment, each of control node 110 and testing node 120, respectively, represents a computing system utilizing clustered computers and components to act as a single pool of seamless resources. In general, each of control node 110 and testing node 120, respectively, can be any computing device or a combination of devices with access to control node 110, testing node 120, storage system 130, storage media 132, and client device 140, and capable of accessing and/or executing control program 112, testing program 122, and client UI 142. In one embodiment, each of control node 110, testing node 120, and client device 140 include internal and external hardware components, as depicted and described in further detail with respect to FIG. 5.

In this exemplary embodiment, control program 112 is stored on control node 110, testing program 122 is stored on testing node 120, and client UI 142 is stored on client device 140. In other embodiments, each of control program 112, testing program 122, and client UI 142 reside on another computing device, provided that each of control node 110, control program 112, testing node 120, testing program 122, storage system 130, storage media 132, client device 140, and client UI 142 can access, and are accessible by, one another. In yet other embodiments, any combination of control program 112, testing program 122, and client UI 142 are stored on any combination of control node 110, testing node 120, and client device 140. In still other embodiments, some or all of control program 112, testing program 122, and client UI 142 are stored externally and accessed through a communication network, such as network 105. Network 105 can be, for example, a local area network (LAN), a wide area network (WAN) such as the Internet, or a combination of the two, and may include wired, wireless, fiber optic or any other connection known in the art. In general, network 105 can be any combination of connections and protocols that will support communications between control node 110, testing node 120, storage system 130, and client device 140, in accordance with a desired embodiment of the present invention.

Control program 112 operates to evaluate the performance of a storage system (e.g., storage system 130). In one embodiment, control program 112 receives an input/output (I/O) pattern. Control program 112 models the received I/O pattern. Control program 112 sends one or more bins to one or more testing nodes for execution. Control program 112 receives statistics from the one or more testing nodes. Control program 112 compiles the received statistics. Control program 112 generates a report based on the compiled statistics.

In one embodiment, a bin is a set of one or more operations. The operations of a bin are organized into jobs, which represent a set of operations of the bin that are all of a particular type. Thus, a bin is a set of jobs. The operations of a bin are performed in any of various orders with respect to one another, as is explained in further detail below. In various examples, the order of execution of operations of a bin may or may not depend on the job to which the operations belong. One or more operations of a bin are performed in parallel with one another. For example, a bin is performed in parallel within a processing node by way of concurrent execution of a plurality of threads. In another example, a bin is performed in parallel across processing nodes by way of concurrent execution of one or more threads of each processing node. In yet other examples, a plurality of operations of a bin are performed in parallel with one another within a processing node or across processing nodes.

Testing program 122 operates to evaluate the performance of a storage system (e.g., storage system 130). In one embodiment, testing program 122 receives a bin from a control program. Testing program 122 initiates execution of the bin. Testing program 122 generates performance statistics. Testing program 122 determines whether write verification is enabled. If write verification is enabled, testing program 122 evaluates write accuracy. Further, if write verification is enabled, testing program 122 generates accuracy statistics. Testing program 122 sends the generated statistics to the control program.

Testing program 122 further operates to evaluate write accuracy. In one embodiment, testing program 122 issues a write command for data. Testing program 122 flushes data from a write buffer. Testing program 122 reads stored data. Testing program 122 compares the written data to the read data.

Storage system 130 is a repository that can be written to and read by one or more of control program 112, testing program 122, and client UI 142. Storage system 130 includes storage media 132. Data can be written to or read from storage system 130 by writing or reading the data from one or more of storage media 132. In one embodiment, storage media 132 includes a set of storage devices logically organized as an array. In various embodiments, each storage media of storage media 132 can be, for example, a magnetic hard disk drive, a solid state drive, a semiconductor storage device, read-only memory (ROM), erasable programmable read-only memory (EPROM), flash memory, a tape storage drive, optical or magnetic disks, or any other computer-readable storage media that is capable of storing digital information. In one embodiment, sample data is stored to and read from one or more of storage media 132. In one embodiment, storage system 130 is a storage system accessible via a network (e.g., network 105). In various examples, storage system 130 may be a network-attached storage system or a storage area network (SAN). In another embodiment, storage system 130 is a storage system residing within a computing device accessible via network 105. For example, storage system 130 is a storage sub-system of a data server (not shown). In some embodiments, storage system 130 is written to and read by client UI 142. In some embodiments, storage system 130 is written to and read by programs and entities outside of testing environment 100 in order to populate one or more of storage media 132 with sample data. In one embodiment, each of storage media 132 reside in storage system 130. In other embodiments, storage system 130 and some or all of storage media 132 reside on another computing device (e.g., control node 110, testing node 120, client device 140), provided that storage media 132 are accessible to testing program 122.

In various embodiments of the present disclosure, client device 140 can be a laptop computer, a tablet computer, a netbook computer, a personal computer (PC), a desktop computer, a personal digital assistant (PDA), a smart phone, or any programmable electronic device capable of communicating with some or all of control node 110, testing node 120, and storage system 130 via network 105. Client device 140 includes client UI 142, which executes locally on client device 140 and operates to provide a user interface to a user of client device 140. Client UI 142 further operates to receive user input from a user via the provided user interface, thereby enabling the user to interact with client device 140. In one embodiment, client UI 142 provides a user interface that enables a user of client device 140 to interact with control program 112 of control node 110 via network 105. In various examples, the user interacts with control program 112 in order to configure, initiate, or view the results of testing of storage system 130. In one embodiment, client UI 142 resides on client device 140. In other embodiments, client UI 142 resides on another computing device (e.g., control node 110), provided that client UI 142 can access and is accessible by at least control program 112.

Figure 2:
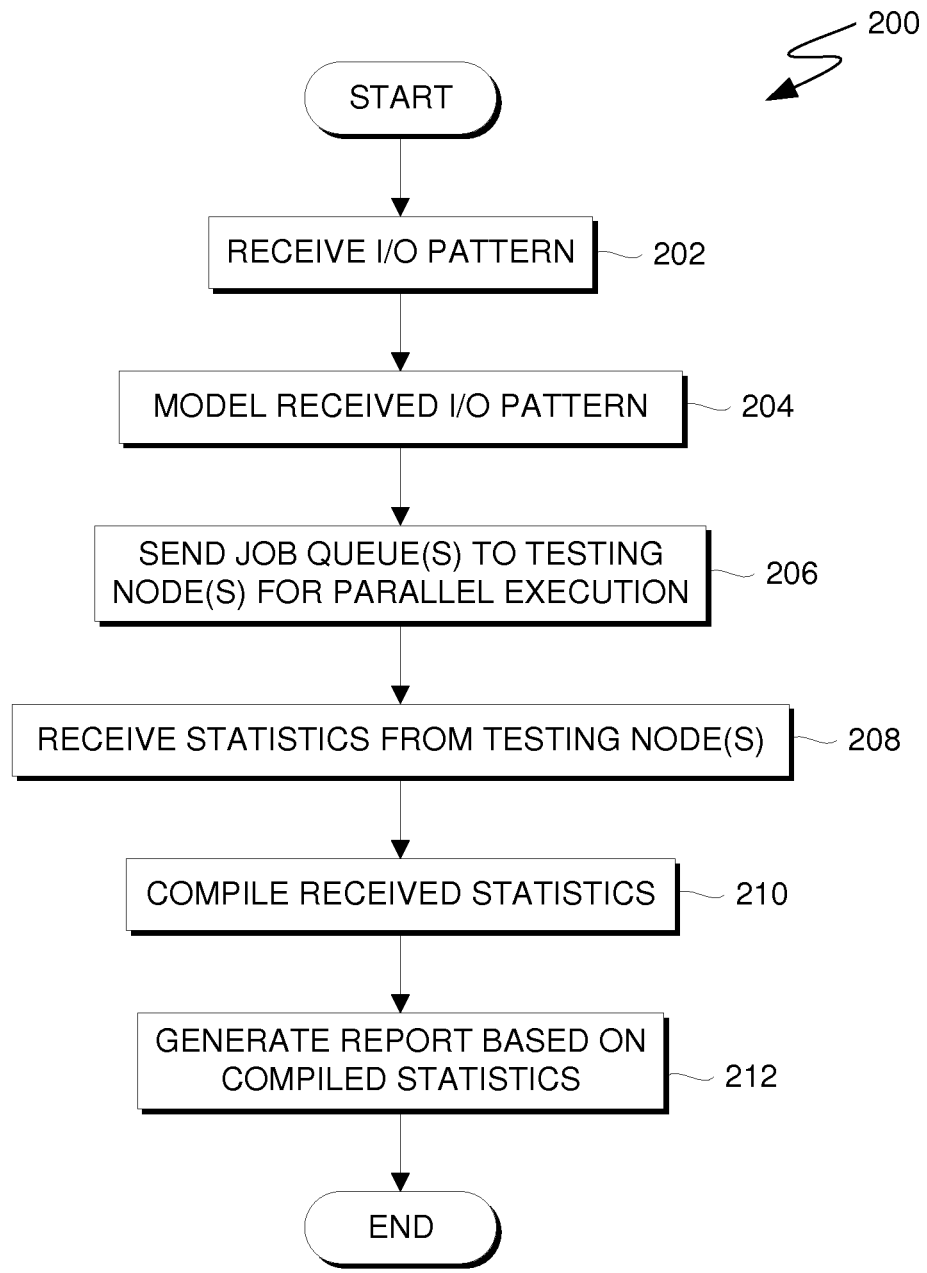
FIG. 2 is a flowchart depicting operations of a control program, on a computing device within the environment of FIG. 1, in accordance with an embodiment of the present disclosure.

FIG. 2 is a flowchart depicting operations of a control program, on a computing device within the environment of FIG. 1, in accordance with an embodiment of the present disclosure. For example, FIG. 2 depicts operations 200, performed by control program 112 on control node 110 within environment 100.

In operation 202, control program 112 receives an I/O pattern. In one embodiment, the I/O pattern represents a pattern of utilization of one or more resources of a storage system. For example, the I/O pattern represents a utilization pattern of storage media 132 of storage system 130. In one embodiment, control program 112 receives the I/O pattern as user input. In various embodiments, the pattern of utilization includes utilization by one or more users or computing devices. For example, an administrator may provide an I/O pattern that represents a pattern of utilization of a storage system by multiple users who simultaneously access the storage system. In another embodiment, the pattern of utilization includes utilization by one or more virtual machines. For example, multiple virtual machines assigned to different tasks utilize a storage system according to different I/O behaviors or patterns.

In one embodiment, the received I/O pattern identifies one or more bins, each of which includes one or more jobs. Each job identifies a type of operation and also identifies one or more parameters. Examples of such types of operations include, without limitation, a read operation, a write operation, a write-access lock operation, and a metadata operation. In one embodiment, each job includes a plurality of operations. For example, a read job includes a plurality of read operations. In some embodiments, a parameter for a read or write operation specifies a read or write pattern. In various examples, the pattern of a read or write operation is random, distributed, or sequential. A distributed read operation includes an operation in which portions of data are read at intervals, which may be referred to as a strided read operation or a strolling read operation. In other examples, the parameter specifies a direction of the read or write operations. For example, the parameter specifies whether operations subsequent to a first proceed through storage addresses forwards (i.e., by incrementing storage addresses) or backwards (i.e., by decrementing storage addresses). In some embodiments, a read or write operation is performed on a file (or other portion of data) which is locked for write access or one which is unlocked. In various examples, a write operation for data which is write-access locked is either authorized or unauthorized for write access by the lock. In one such example, testing program 122 generates performance statistics (see operation 306) reflecting whether authorized and unauthorized write operations fail or succeed. In one embodiment, a locking or unlocking operation updates whether a portion of stored data is locked for exclusive write access. In various embodiments, metadata operations include metadata read operations and metadata write operations, each of which is random, distributed, or sequential (e.g., as specified by a parameter). Metadata includes various types of stored data that relate to other stored data such as, for example, metafiles, directory data, master file tables, or file allocation tables. In various examples, parameters of a job specify how many times to perform an operation, whether to perform the operations of the job at addresses that are sequential, distributed, or random, an amount of data upon which to perform each operation, or how many threads to use. An additional parameter for a read operation specifies whether write verification is enabled. In an embodiment, some or all of the parameters are optional for a given job; in this case, optional parameters have default values. For example, by default, the write verification parameter is disabled for read operations. In one embodiment, control program 112 can evaluate an I/O pattern in which a file is accessed by multiple users or devices concurrently. For example, an I/O pattern simulating a database access environment can include a performance test in which multiple instances of testing program 122 each access a particular file of storage system 130. Such accesses may include read operations, write operations, or a combination thereof. In this case, testing program 122 may collect performance statistics that indicate whether the storage system serializes concurrent access from parallel threads.

In one embodiment, the received I/O pattern identifies an order in which to perform the jobs of a bin. In some embodiments, the jobs of a bin are performed sequentially. For example, each operation of the job is performed in a predetermined, sequential order. In other embodiments, the operations of a job are performed randomly. For example, operations of the job are randomly selected from among the operations of the job until a pre-determined number of operations of the job have been performed or, alternatively, until no operations of the job remain unperformed. In one example, a randomly selected job is eligible to be randomly selected again. In another embodiment, a randomly selected job is not eligible to be randomly selected again. In some embodiments, the jobs of a bin are performed in a sequential order. For example, each job is performed in a predetermined order, wherein each job is performed by performing the operations of the job. In other embodiments, the jobs of a bin are performed in a random order. For example, a first job is randomly selected from among the jobs of the bin and is performed prior to randomly selecting a second job from among the jobs of the bin. In yet other embodiments, the jobs of a bin are performed in a round-robin fashion. For example, a first operation of each job of the bin is performed prior to a second job of each job of the bin being performed.

In some embodiments, one or both of control program 112 and testing program 122 store the sequence of random operations performed. The stored sequence may be retrieved for later presentation. For example, a random write test performs write operations at random storage addresses of storage system 130. Testing program 122 stores a list of the storage addresses to testing node 120. Control program 112 gathers the results of the random write test. A user of client device 140 views the results of the random write tests and desires additional information. Control program 112 receives a request for the list of storage addresses from client device 140. In response, control program 112 retrieves the list of storage addresses from testing node 120 and provides the list of storage addresses to client device 140.

The performance of individual read, write, or other resource access operations vary based on combinations of conditions. For example, a write operation identifies a storage address already populated with data (i.e., an overwrite operation). Some types of storage media (e.g., certain SSDs) require a preliminary erase operation prior to the write operation. Therefore, in this example, the speed of a write operation is impacted based on whether the destination address is already populated with data. In another example, performance of a read operation is impact based on whether the storage address to be read is locked for write access. In another example, the performance of operations is impacted based on whether the addresses of the operations are sequential.

In operation 204, control program 112 models the received I/O pattern. In one embodiment, the model is a representation of the I/O pattern using text, graphics, or a combination thereof. For example, control program 112 models the I/O pattern by generating a histogram based on the received I/O pattern. In one embodiment, the histogram is represented graphically. Each column of the histogram represents a bin. Each bin includes one or more jobs, each of which is a performance test that can be performed on storage system 130. Each column includes one or more portions, each of which represents a job of the bin that the column represents. In one embodiment, each bin executes in parallel with each other bin. In one embodiment, the height of a column is proportional to the number of resource access operations of the bin represented by the column. Further, the height of each portion of a column is proportional to the number of resource access operations of the job represented by the portion. In one embodiment, the width of a column is proportional to the size of the file used by each job of the bin represented by the column. In one embodiment, each portion of a column is graphically or visually distinguishable from adjacent portions of the column. In one embodiment, a portion of a column shares graphical or visual features (e.g., color or pattern) with other portions that represent the same type of job. For example, portions that represent random read operations are blue, while portions that represent random write operations are orange. In one embodiment, each bin is executed by one or more testing nodes (e.g., testing node 120) utilizing one or more threads. Threads of a testing node can be executed concurrently with one another. For example, a plurality of testing nodes executing bins in parallel each include a plurality of threads executing concurrently. Thus, embodiments of the present invention provide parallelism at both the level of testing nodes and threads on each testing node.

Figure 5:
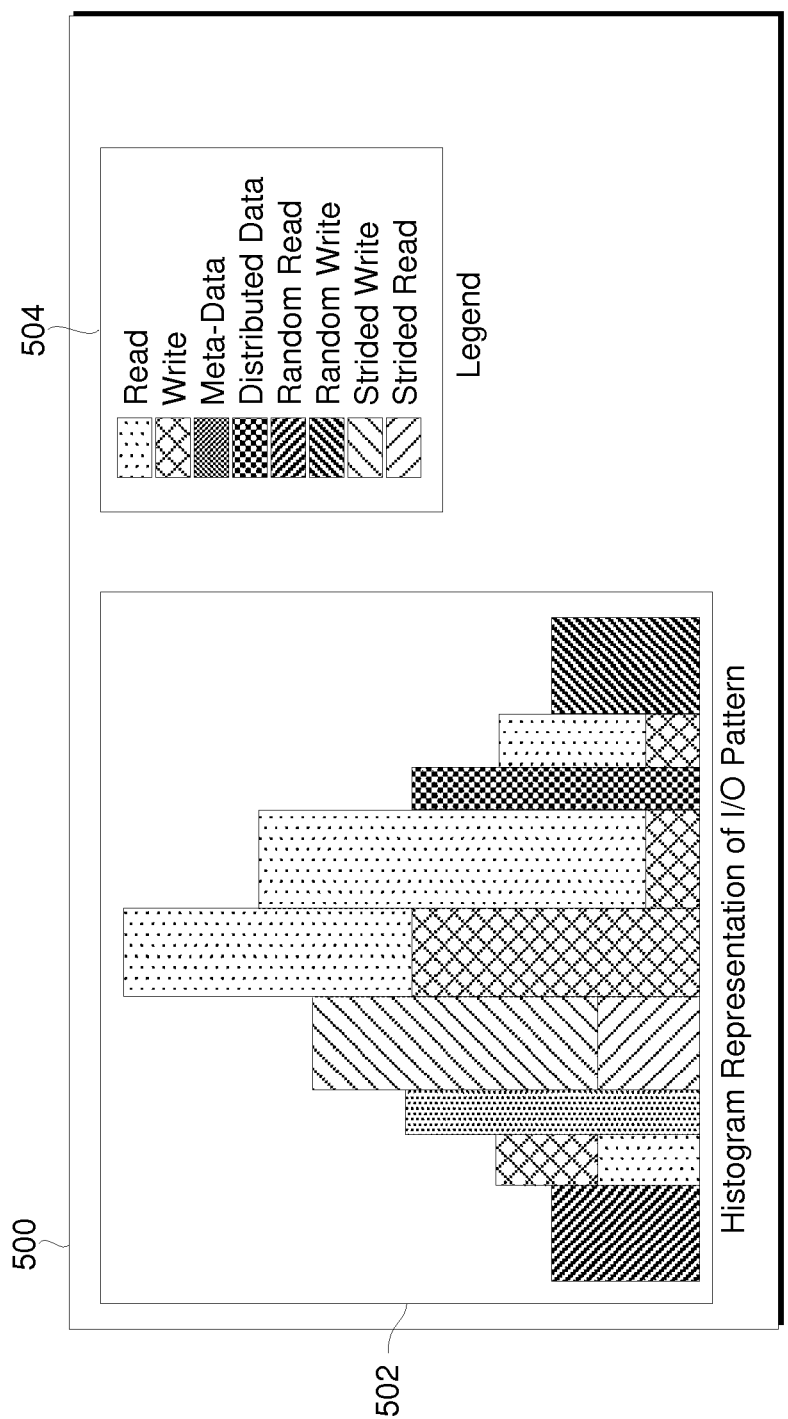
FIG. 5 is a block diagram of a user interface, in accordance with an embodiment of the present disclosure.

In some embodiments, control program 112 receives a model of the I/O pattern as user input. For example, control program 112 receives a histogram as user input from a user of client device 140 via client UI 142. In such an embodiment, control program 112 receives the I/O pattern (see operation 202) by determining the I/O pattern that the received histogram represents. Further, control program 112 models the I/O pattern by presenting the validated histogram to a user (e.g., via client UI 142). Control program 112 adjusts the histogram based on user input, thereby changing the received I/O pattern and the model. For example, FIG. 5 depicts a portion of a user interface, in accordance with an embodiment of the present invention. User interface 500 includes histogram 502 and legend 504. Histogram 502 includes a number of columns, each of which includes at least one portion. Each portion of each column is shaded to indicate the type of job represented by the portion. Legend 504 indicates which types of shading correspond with which types of jobs.

In operation 206, control program 112 sends one or more bins to one or more testing nodes for execution. In one embodiment, control program 112 sends each bin to a testing node. For example, control program 112 sends a bin to testing program 122 of testing node 120. As stated previously, in one embodiment, testing node 120 represents a plurality of testing nodes. Control program 112 selects one or more of the testing nodes represented by testing node 120 based upon the characteristics of each testing node. For example, control program 112 selects testing nodes with a communication latency to network 105 that falls below a pre-determined threshold. In another example, control program 112 selects testing nodes based on the hardware capabilities and available resources of the testing node to ensure that the testing node can perform the operations of the bin without any bottleneck that would affect the results of a performance evaluation of storage system 130. In one embodiment, control program 112 selects one or more testing nodes represented by testing node 120 and sends one or more bins to the selected testing nodes.

In operation 208, control program 112 receives statistics from the one or more testing nodes. For example, the statistics received from each testing node include performance statistics, write verification statistics, or a combination thereof. In one embodiment, the statistics represent results of one or more tests performed by testing program 122. In one embodiment, control program 112 receives statistics from each testing node to which control program 112 sent a bin.

In operation 210, control program 112 compiles the received statistics. In one embodiment, control program 112 compiles performance statistics based on the performance statistics received from each testing node. For example, control program 112 compiles write verification statistics based on the write verification received from each testing node, if any. In one embodiment, control program 112 compiles statistics by grouping the results of each type of job based on the operation and parameters of the jobs.

In operation 212, control program 112 generates a report based on the compiled statistics. In one embodiment, the report includes some or all of the compiled statistics. For example, the report includes one or more graphical presentations of some or all of the compiled statistics. In another example, the report includes the I/O pattern, the model of the I/O pattern, or both. In one embodiment, control program 112 presents the generated report to a user. For example, control program 112 presents the generated report to a user of client device 140 via client UI 142.

Figure 3:
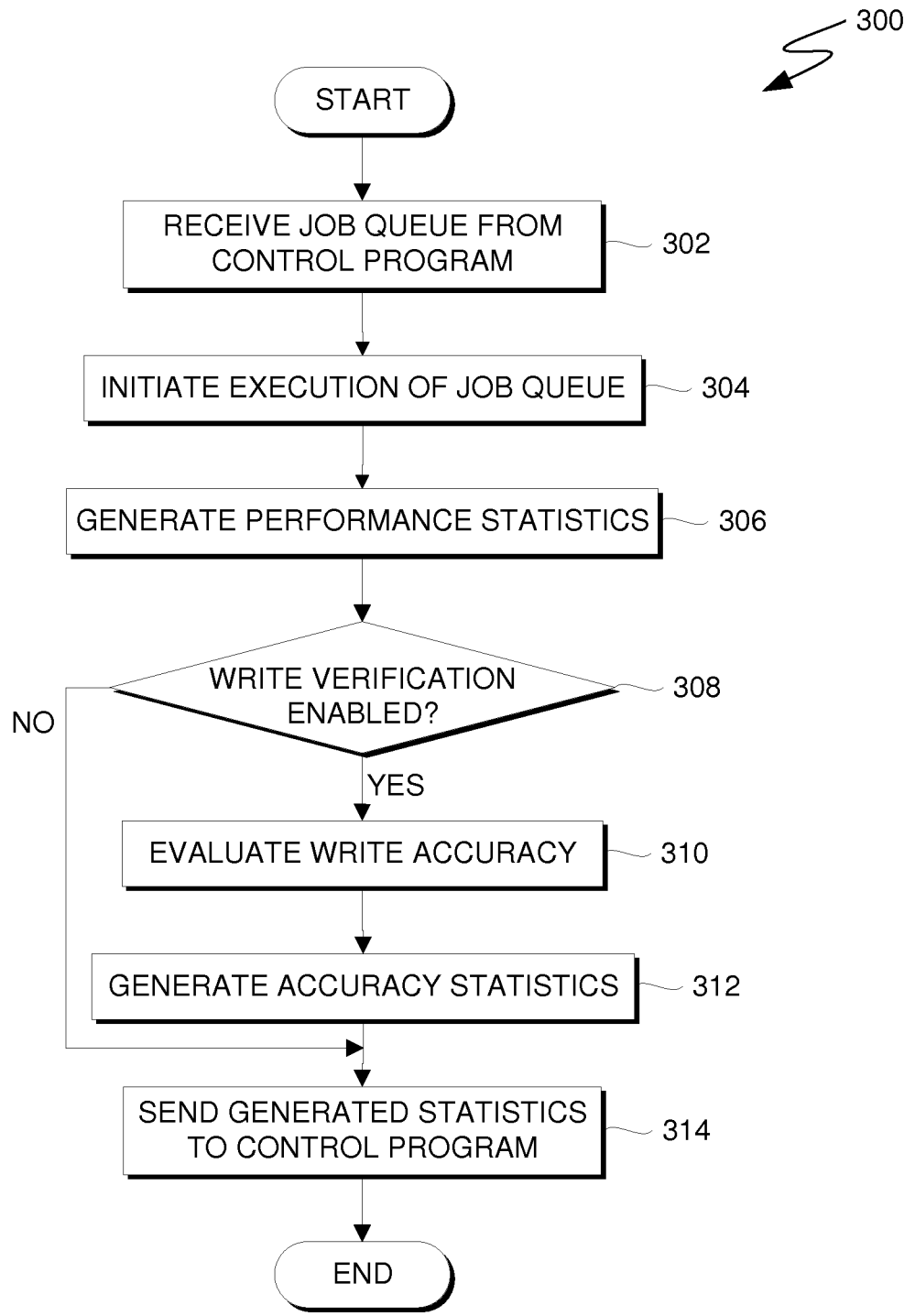
FIG. 3 is a flowchart depicting operations of a testing program, on a computing device within the environment of FIG. 1, in accordance with an embodiment of the present disclosure.
Figure 4:
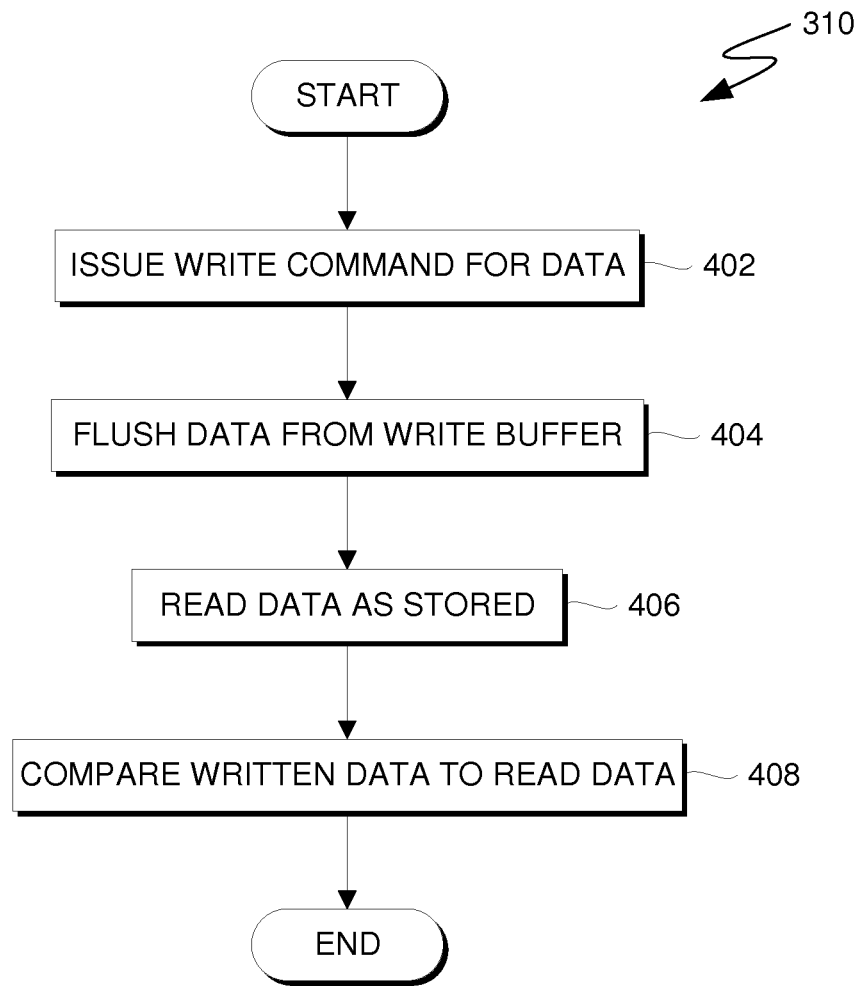
FIG. 4 is a flowchart depicting operations for write verification, on a computing device within the environment of FIG. 1, in accordance with an embodiment of the present disclosure.

FIG. 3 is a flowchart depicting operations of a testing program, on a computing device within the environment of FIG. 1, in accordance with an embodiment of the present disclosure. For example, FIG. 3 depicts operations 300 performed by testing program 122, on testing node 120 within environment 100. For ease of description, testing program 122 of testing node 120 is discussed. However, in one embodiment, the operations described in connection with FIGS. 3-4 are performed by each of one or more instances of testing program 122, each of which resides on a testing node.

In operation 302, testing program 122 receives a bin from a control program. In one embodiment, testing program 122 receives a bin from control program 112. As described above, in one embodiment, the bin identifies one or more jobs, each of which identifies an operation and one or more parameters.

In operation 304, testing program 122 initiates execution of the received bin. Testing program 122 performs the operations identified by each job of the bin. For example, testing program 122 performs the operations on storage system 130. In one embodiment, each instance of testing program 122 executes each bin using one or more threads of execution. For example, each job of a bin specifies a number of threads of execution to utilize and operations for each such thread to perform.

In operation 306, testing program 122 generates performance statistics. In one embodiment, the performance statistics include a result of each operation of each job (e.g., a seek time of one or more read operations). In one embodiment, the performance statistics include a result of a statistical operation on a result of one or more operations (e.g., an average seek time of all read operations of a job). In one embodiment, the performance statistics generally include any statistical measure of performance of storage system 130 that is measurable by the instance of testing program 122 that is performing the jobs of the bin. In various examples, the performance statistics include statistical measures related to read and write access times, peak read and write speeds, sustained read and write speeds, I/O operations per second, and write-access locking or unlocking speeds. The performance statistics associate each test (i.e., each job of the bin) with the statistical measures resulting from test.

In decision operation 308, testing program 122 determines whether write verification is enabled for a job. Testing program 122 performs decision operation 308 for each job of the bin. If testing program 122 determines that write verification is enabled for a job (decision operation 308, YES branch), then testing program 122 evaluates the accuracy of any write operations of the job (operation 310), a possible implementation of which is discussed more fully in connection with FIG. 4. If testing program 122 determines that write verification is not enabled for a job (decision operation 308, NO branch), then testing program 122 sends the generated statistics to control program 112 (operation 314), as discussed more fully below.

In some embodiments, testing program 122 performs decision operation 308 at the time of execution of the job. Thus, testing program 122 evaluates the accuracy of each write operation in response to performing the write operation. In some embodiments, testing program 122 evaluates the write accuracy of the write operations of a job after all write operations of the job have completed. In yet another embodiment, testing program 122 evaluates the write accuracy of the write operations of a job in multiple phases. For example, the data written by a first write operation of a job is overwritten by a second write operation of the job. In this case, testing program 122 evaluates the write accuracy of the first write operation before performing the second write operation.

In operation 312, testing program 122 generates accuracy statistics. The accuracy statistics reflect the results of one or more write verification operations. An implementation of operation 312 is discussed in more detail in connection with FIG. 4 and the accompanying discussion.

In operation 314, testing program 122 sends the generated statistics to control program 112. The generated statistics include performance statistics generated by testing program 122 (see operation 306). In one embodiment, the generated statistics include accuracy statistics generated by testing program 122 (see operation 312).

FIG. 4 is a flowchart depicting operations for write verification, on a computing device within the environment of FIG. 1, in accordance with an embodiment of the present disclosure. For example, FIG. 4 depicts operations that represent an implementation of operation 310, in accordance with one embodiment. In one embodiment, testing program 122 performs the operations depicted in FIG. 4 for each write verification operation.

In operation 402, testing program 122 issues a write command for data. In one embodiment, testing program 122 issues the write command to a destination storage device (e.g., one or more storage media 132 of storage system 130). In one embodiment, the write command specifies a storage address. In another embodiment, testing program 122 receives a storage address from the destination storage device. In one embodiment, the data includes a portion of sample data. In one embodiment, testing program 122 generates the sample data, retrieves the sample data from a data store, or a combination thereof. For example, testing program 122 retrieves data from a data store (not shown) of testing node 120, and generates the sample data by randomizing some or all of the retrieved data. For example, the data of the write command is a portion of data of any size capable of being written to the destination storage device. In one embodiment, the destination storage device stores some or all of the data in a write buffer prior to storing the data to persistent storage.

In operation 404, testing program 122 flushes the data from a write buffer. The destination storage device includes a write buffer that, for example, temporarily stores data prior to storing the data to persistent storage. In one embodiment, testing program 122 flushes the write buffer of the destination storage device to ensure that the destination storage device has completed the storage operation responsive to the write command. Flushing the write buffer causes the data temporarily stored in the write buffer to be stored to persistent storage. For example, testing program 122 issues a write command to one of storage media 132 (see operation 402), which temporarily stores some or all of the data of the write command in a write buffer. Testing program 122 flushes the data from the write buffer of the one of storage media 132 by issuing a write buffer flush command to the one of storage media 132. In response, the one of storage media 132 stores to persistent storage any portion of the data that had been temporarily stored in the write buffer.

In operation 406, testing program 122 reads data as stored. In one embodiment, testing program 122 retrieves the data from the destination storage device. For example, testing program 122 requests the data from the destination storage device and, in response, testing program 122 receives the requested data. The request identifies the data by, for example, the storage address to which the data was stored, or by an identifier associated with the data, such as a file name. In some embodiments, testing program 122 reads the data as stored via direct I/O access. In other embodiments, testing program 122 reads the data as stored via one or more layers of controllers, firmware, hardware, software, networks, or other communicative links.

In operation 408, testing program 122 compares the written data to the read data. In one embodiment, testing program 122 compares the written data to the read data and, in response, determines whether the data as written matches the data as read. For example, testing program 122 determines a match based on whether a hash value of the written data equals a hash value of the read data. Alternatively, testing program 122 determines a match based on whether each byte of the written data matches each corresponding byte of the read data. Testing program 122 generates at least one accuracy statistic based on the result of the comparison. For example, testing program 122 generates an accuracy statistic that represents whether the written data matches the read data. Alternatively, the accuracy statistic represents a degree to which the written data matches the read data.

Figure 6:
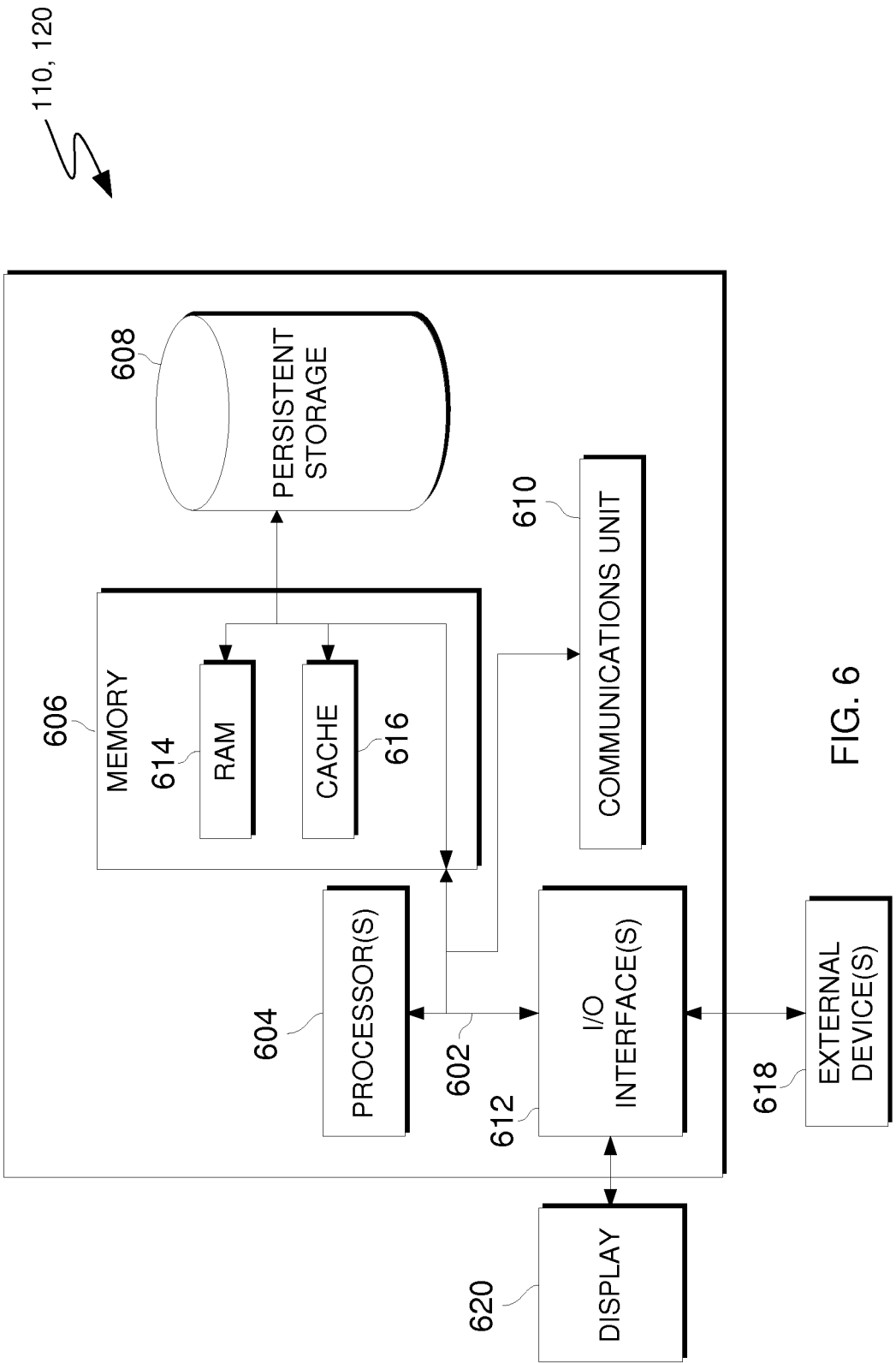
FIG. 6 is a block diagram of components of the computing device executing a control program and a testing program, in accordance with an embodiment of the present disclosure.

FIG. 6 is a block diagram of the components of each of control node 110, testing node 120, and client device 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Each of control node 110, testing node 120, and client device 140, respectively, include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Each of control program 112, testing program 122, and client UI 142, respectively, are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 105. In these examples, communications unit 610 includes one or more network interface cards. Communications unit 610 may provide communications through the use of either or both physical and wireless communications links. Each of control program 112, testing program 122, and client UI 142 may be downloaded to persistent storage 608 through communications unit 610.

I/O interface(s) 612 allows for input and output of data with other devices that may be connected to each of control node 110, testing node 120, and client device 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., control program 112, testing program 122, and client UI 142, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The term(s) "Smalltalk" and the like may be subject to trademark rights in various jurisdictions throughout the world and are used here only in reference to the products or services properly denominated by the marks to the extent that such trademark rights may exist.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for parallel storage system testing, the method comprising:
   receiving, by one or more processors, an input/output (I/O) pattern identifying an order in which to execute one or more sets of jobs;
   determining, by one or more processors, the one or more sets of jobs based, at least in part, on the I/O pattern, wherein each of the one or more sets of jobs identifies one or more jobs, and wherein each job identifies one or more I/O operations;
   assigning, by one or more processors, each set of jobs of the one or more sets of jobs to a processing node of one or more processing nodes; and
   executing, by one or more processors, the one or more sets of jobs concurrently.

2. The method of claim 1, wherein the I/O pattern identifying a pattern of utilization of one or more resources of a storage system.

3. The method of claim 2, wherein receiving the I/O pattern comprises:
receiving a graphical representation of the I/O pattern.

4. The method of claim 3, wherein the graphical representation is a histogram.

5. The method of claim 1, wherein each job of each set of jobs has a type of operation and one or more parameters.

6. The method of claim 5, wherein the type of operation of each job is selected from a group comprising: a read operation, a write operation, a write-access lock operation, and a metadata operation; and
wherein each of the one or more parameters of each job is selected from a group comprising: a read pattern, a write pattern, a read direction, and a write direction.

7. The method of claim 5, wherein the one or more parameters identified by each job include a write verification parameter.

8. The method of claim 7, wherein the write verification parameter specifies that write verification is enabled for a write operation, and further comprising:
issuing, by one or more processors, to a storage device a write command for a first portion of data;
flushing, by one or more processors, a write buffer of the storage device;
reading, by one or more processors, from the storage device a second portion of data; and
determining, by one or more processors, whether the first portion of data matches the second portion of data.

9. A computer program product for parallel storage system testing, the computer program product comprising:
a computer readable storage medium and program instructions stored on the computer readable storage medium, the program instructions comprising:
program instructions to receive an input/output (I/O) pattern identifying an order in which to execute one or more sets of jobs;
program instructions to determine the one or more sets of jobs based, at least in part, on the I/O pattern, wherein each of the one or more sets of jobs identifies one or more jobs, and wherein each job identifies one or more I/O operations;
program instructions to assign each set of jobs of the one or more sets of jobs to a processing node of one or more processing nodes; and
program instructions to execute the one or more sets of jobs concurrently.

10. The computer program product of claim 9, wherein the I/O pattern identifies a pattern of utilization of one or more resources of a storage system.

11. The computer program product of claim 10, wherein the program instructions to receive the I/O pattern comprise:
program instructions to receive a graphical representation of the I/O pattern.

12. The computer program product of claim 11, wherein the graphical representation is a histogram.

13. The computer program product of claim 9, wherein each job of each set of jobs has a type of operation and one or more parameters.

14. The computer program product of claim 13, wherein the type of operation of each job is selected from a group comprising: a read operation, a write operation, a write-access lock operation, and a metadata operation; and
wherein each of the one or more parameters of each job is selected from a group comprising: a read pattern, a write pattern, a read direction, and a write direction.

15. A computer system for parallel storage system testing, the computer system comprising:
one or more computer processors;
one or more computer readable storage media;
program instructions stored on the computer readable storage media for execution by at least one of the one or more processors, the program instructions comprising:
program instructions to receive an input/output (I/O) pattern identifying an order in which to execute one or more sets of jobs;
program instructions to determine the one or more sets of jobs based, at least in part, on the I/O pattern, wherein each of the one or more sets of jobs identifies one or more jobs, and wherein each job identifies one or more I/O operations;
program instructions to assign each set of jobs of the one or more sets of jobs to a processing node of one or more processing nodes; and
program instructions to execute the one or more sets of jobs concurrently.

16. The computer system of claim 15, wherein the I/O pattern identifies a pattern of utilization of one or more resources of a storage system.

17. The computer system of claim 16, wherein the program instructions to receive the I/O pattern comprise:
program instructions to receive a graphical representation of the I/O pattern.

18. The computer system of claim 17, wherein the graphical representation is a histogram.

19. The computer system of claim 15, wherein each job of each set of jobs has a type of operation and one or more parameters.

20. The computer system of claim 19, wherein the type of operation of each job is selected from a group comprising: a read operation, a write operation, a write-access lock operation, and a metadata operation; and
wherein each of the one or more parameters of each job is selected from a group comprising: a read pattern, a write pattern, a read direction, and a write direction.

* * * * *